United States Patent
Yee et al.

(10) Patent No.: US 9,198,212 B2
(45) Date of Patent: *Nov. 24, 2015

(54) DIRECT LINK SETUP MECHANISMS FOR WIRELESS LANS

(71) Applicant: Marvell World Trade Ltd., St. Michael (BB)

(72) Inventors: James Yee, Fremont, CA (US); Sandesh Goel, Fremont, CA (US); Milind Kopikare, Sunnyvale, CA (US); James Chieh-Tsung Chen, Santa Clara, CA (US)

(73) Assignee: Marvell World Trade LTD., St. Michael (BB)

( * ) Notice: Subject to any disclaimer, the term of this patent is extended or adjusted under 35 U.S.C. 154(b) by 238 days.

This patent is subject to a terminal disclaimer.

(21) Appl. No.: 13/871,490

(22) Filed: Apr. 26, 2013

(65) Prior Publication Data

US 2014/0321297 A1 Oct. 30, 2014

Related U.S. Application Data

(63) Continuation of application No. 11/523,407, filed on Sep. 19, 2006, now Pat. No. 8,432,920.

(51) Int. Cl.
*H04W 76/02* (2009.01)
*H04W 52/02* (2009.01)

(52) U.S. Cl.
CPC ........ *H04W 76/023* (2013.01); *H04W 52/0245* (2013.01)

(58) Field of Classification Search
USPC ........................................ 370/329, 331, 332
See application file for complete search history.

(56) References Cited

U.S. PATENT DOCUMENTS

| | | |
|---|---|---|
| 2004/0063458 A1 | 4/2004 | Hori et al. |
| 2004/0127214 A1 | 7/2004 | Reddy et al. |

(Continued)

FOREIGN PATENT DOCUMENTS

| | | |
|---|---|---|
| EP | 1638259 A2 | 3/2006 |
| JP | 2002-171283 A | 6/2002 |

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages.

(Continued)

*Primary Examiner* — Michael Thier
*Assistant Examiner* — Feben M Haile

(57) ABSTRACT

A client station including a communication circuit to communicate, via an infrastructure mode, with an access point in a basic service set; identify, based on signals transmitted by the access point, a plurality of client stations in the basic service set capable of communicating via a direct link setup mode; and during a predetermined time period, communicate, via the direct link setup mode, with the plurality of client stations; and a control circuit to, during the predetermined time period, determine strength of signals received from the plurality of client stations via the direct link setup mode, determine highest supportable data rates for communicating with the plurality of client stations via the direct link setup mode, and select, based on (i) the strength of the signals and (ii) the highest supportable data rates, one or more of the plurality of client stations for communicating via the direct link setup mode.

12 Claims, 11 Drawing Sheets

(56) References Cited

U.S. PATENT DOCUMENTS

| | | |
|---|---|---|
| 2004/0240405 A1 | 12/2004 | Okazaki |
| 2005/0124294 A1 | 6/2005 | Wentink |
| 2005/0135304 A1 | 6/2005 | Wentink et al. |
| 2005/0226183 A1 | 10/2005 | Penumetsa |
| 2006/0165035 A1 | 7/2006 | Chandra et al. |
| 2007/0008922 A1 | 1/2007 | Abhishek et al. |
| 2007/0064643 A1 | 3/2007 | Tavares |
| 2007/0259700 A1 | 11/2007 | Meier et al. |

FOREIGN PATENT DOCUMENTS

| | | |
|---|---|---|
| JP | 2004-336779 A | 11/2004 |
| JP | 2006/165982 A | 6/2006 |
| WO | WO-0115387 A1 | 3/2001 |
| WO | WO-2006000617 A1 | 1/2006 |
| WO | WO-2006/081123 A2 | 8/2006 |
| WO | WO-2007008857 A2 | 1/2007 |
| WO | WO-2007095396 A1 | 8/2007 |

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h-2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

802.11n; IEEE P802.11-04/0889r6; Wireless LANs, TGn Sync Proposal Technical Specification; 134 pages.

The International Search Report and the Written Opinion of the International Searching Authority, or the Declaration dated May 9, 2008 for Internation Application No. PCT/US2007/020294 filed Sep. 19, 2009; 23 pages.

Office Action issued in the corresponding Japanese Patent Application No. 2009-529222, issued Nov. 1, 2011, and its English translation, 4 pages.

DIRECT LINK SETUP MECHANISMS FOR WIRELESS LANS

CROSS-REFERENCE TO RELATED APPLICATIONS

This is a continuation of U.S. patent application Ser. No. 11/523,407, filed on Sep. 19, 2006. The entire disclosure of the application referenced above is incorporated herein by reference.

BACKGROUND

The present invention relates generally to data communications. More particularly, the present invention relates to direct link setup mechanisms for wireless local-area networks (WLAN).

Wireless local-area networks (WLAN) have become increasingly popular for communicating data between electronic devices. WLANs are frequently operated in infrastructure mode, where a wireless access point relays data between the electronic devices, which are referred to as wireless clients. Each communication between two wireless clients in infrastructure mode requires two sequential transmissions: from the sending wireless client to the wireless access point, and from the wireless access point to the receiving wireless client. In many cases, a direct link between the two wireless clients would be preferable.

Direct link setup (DLS), which is described in IEEE standard 802.11e, provides this capability. FIG. 1 shows a conventional IEEE 802.11 WLAN 100 comprising a wireless access point 102 passing traffic between two wireless clients 104A,B in infrastructure mode over connections 106A,B respectively. DLS allows wireless clients 104A,B to establish a direct connection 108. However, DLS as specified by IEEE 802.11e has several limitations.

IEEE 802.11e requires that wireless clients use the same channel for DLS as for the Basic Service Set (BSS) to which they belong. This is an unnecessary restriction if other channels are available for use. Furthermore, IEEE 802.11e DLS explicitly disables legacy power-save and Automatic Power-Save Delivery (APSD), resulting in increased power consumption for wireless clients operating in DLS mode. IEEE 802.11e DLS also does not define the precise conditions for initiating/tearing-down a DLS session or the operating parameters to be used during a DLS session. In addition, IEEE 802.11e DLS does not specify a specific protection mechanism to be used during DLS data transfer in order to mitigate interference from other traffic sources.

SUMMARY

In general, in one aspect, the invention features an apparatus comprising: a communication circuit to establish an infrastructure mode wireless connection with a wireless client through a wireless access point, and to establish a direct link setup (DLS) mode wireless connection with the wireless client; and a control circuit to select either infrastructure mode or DLS mode for communication with the wireless client based on at least one characteristic of the infrastructure mode and DLS mode wireless connections; wherein the communication circuit exchanges frames of data with the wireless client using the selected mode.

In some embodiments, the at least one characteristic of the wireless connections comprises at least one of the group consisting of: a quality of service of the wireless connections; a power consumption of the wireless connections; a received signal strength of the wireless connections; a time required to send a frame over the wireless connections; a maximum data rate of the wireless connections; and a packet loss rate of the wireless connections. In some embodiments, the communication circuit receives a message from the wireless access point that identifies the media access control (MAC) address of the wireless client; and the control circuit identifies the wireless client based on the message. In some embodiments, the message indicates whether the wireless client is capable of establishing a DLS connection. In some embodiments, before receiving the message from the wireless access point, the communication circuit transmits a further message to the wireless access point that identifies one or more data stream types supported by the apparatus; and the message received from the wireless access point identifies the wireless client only when the wireless client supports the one or more data stream types supported by the apparatus. In some embodiments, the control circuit identifies the wireless client by collecting destination media access control (MAC) addresses in frames transmitted by the wireless access point. In some embodiments, the control circuit, after selecting DLS mode for the wireless client, selects infrastructure mode for the wireless client in response to an event. In some embodiments, the event is selected from the group consisting of: a received signal strength of a DLS connection with the wireless client falls below a predetermined threshold; and the control circuit detects no frames addressed to the wireless client during a predetermined interval. In some embodiments, the control circuit determines proximity information for the wireless client, and selects the wireless client for DLS mode communications based on the proximity information. In some embodiments, the communication circuit establishes the infrastructure mode wireless connection on a first channel; wherein the communication circuit establishes the DLS mode wireless connection on a second channel; and wherein the control circuit selects the second channel when selecting DLS mode. In some embodiments, the control circuit causes the apparatus to enter a power-save mode; wherein the communication circuit receives beacon signals from the wireless access point while the apparatus is in the power-save mode; and wherein after every Nth beacon, wherein N>0, the control circuit causes the apparatus to leave the power-save mode, then the communication circuit communicates with the wireless client when DLS mode has been selected using the DLS mode connection, and then the control circuit causes the apparatus to enter the power-save mode again. In some embodiments, the wireless client, when DLS mode has been selected, receives the beacon signals, leaves the power-save mode when the control circuit causes the apparatus to leave the power-save mode, and enters the power-save mode when the control circuit causes the apparatus to enter the power-save mode. In some embodiments, the communication circuit transmits a message to the wireless access point informing the wireless access point that the apparatus is entering the power-save mode. In some embodiments, the communication circuit and the wireless client, when DLS mode has been selected, receive beacon signals from the wireless access point; wherein the control circuit establishes a communications schedule with the wireless client according to the beacon signals; wherein the control circuit causes the apparatus to leave a power-save mode, and then the communication circuit establishes a DLS connection with the wireless client, according to the communications schedule; and wherein the wireless client leaves the power-save mode, and establishes a DLS connection with the apparatus, according to the communications schedule. In some embodiments, the communication circuit transmits a message to the wireless access point informing the wireless access point that the apparatus is entering the power-save mode. Some embodiments comprise a media access controller (MAC) comprising the apparatus. Some embodiments comprise an integrated circuit comprising the MAC. Some embodiments comprise a wireless device comprising the integrated circuit. In some embodiments, the wireless device is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, the invention features an apparatus comprising: communication means for establishing an infrastructure mode wireless connection with a wireless client through a wireless access point, and for establishing a direct link setup (DLS) mode wireless connection with the wireless client; and control means for selecting either infrastructure mode or DLS mode for communication with the wireless client based on at least one characteristic of the infrastructure mode and DLS mode wireless connections; wherein the communication means exchanges frames of data with the wireless client using the selected mode.

In some embodiments, the at least one characteristic of the wireless connections comprises at least one of the group consisting of: a quality of service of the wireless connections; a power consumption of the wireless connections; a received signal strength of the wireless connections; a time required to send a frame over the wireless connections; a maximum data rate of the wireless connections; and a packet loss rate of the wireless connections. In some embodiments, the communication means receives a message from the wireless access point that identifies the media access control (MAC) address of the wireless client; and wherein the control means identifies the wireless client based on the message. In some embodiments, the message indicates whether the wireless client is capable of establishing a DLS connection. In some embodiments, before receiving the message from the wireless access point, the communication means transmits a further message to the wireless access point that identifies one or more data stream types supported by the apparatus; and wherein the message received from the wireless access point identifies the wireless client only when the wireless client supports the one or more data stream types supported by the apparatus. In some embodiments, the control means identifies the wireless client by collecting destination media access control (MAC) addresses in frames transmitted by the wireless access point. In some embodiments, the control means, after selecting DLS mode for the wireless client, selects infrastructure mode for the wireless client in response to an event. In some embodiments, the event is selected from the group consisting of: a received signal strength of a DLS connection with the wireless client falls below a predetermined threshold; and the control means detects no frames addressed to the wireless client during a predetermined interval. In some embodiments, the control means determines proximity information for the wireless client, and selects the wireless client for DLS mode communications based on the proximity information. In some embodiments, the communication means establishes the infrastructure mode wireless connection on a first channel; wherein the communication means establishes the DLS mode wireless connection on a second channel; and wherein the control means selects the second channel when selecting DLS mode. In some embodiments, the control means causes the apparatus to enter a power-save mode; wherein the communication means receives beacon signals from the wireless access point while the apparatus is in the power-save mode; and wherein after every Nth beacon, wherein N>0, the control means causes the apparatus to leave the power-save mode, then the communication means communicates with the wireless client when DLS mode has been selected using the DLS mode connection, and then the control means causes the apparatus to enter the power-save mode again. In some embodiments, the wireless client, when DLS mode has been selected, receives the beacon signals, leaves the power-save mode when the control means causes the apparatus to leave the power-save mode, and enters the power-save mode when the control means causes the apparatus to enter the power-save mode. In some embodiments, the communication means transmits a message to the wireless access point informing the wireless access point that the apparatus is entering the power-save mode. In some embodiments, the communication means and the wireless client, when DLS mode has been selected, receive beacon signals from the wireless access point; wherein the control means establishes a communications schedule with the wireless client according to the beacon signals; wherein the control means causes the apparatus to leave a power-save mode, and then the communication means establishes a DLS connection with the wireless client, according to the communications schedule; and wherein the wireless client leaves the power-save mode, and establishes a DLS connection with the apparatus, according to the communications schedule. In some embodiments, the communication means transmits a message to the wireless access point informing the wireless access point that the apparatus is entering the power-save mode. Some embodiments comprise a media access controller (MAC) comprising the apparatus. Some embodiments comprise an integrated circuit comprising the MAC. Some embodiments comprise a wireless device comprising the integrated circuit. In some embodiments, the wireless device is compliant with all or part of IEEE standard 802.11, including draft and approved amendments 802.11a, 802.11b, 802.11e, 802.11g, 802.11i, 802.11k, 802.11n, 802.11v, and 802.11w.

In general, in one aspect, the invention features a method comprising: establishing an infrastructure mode wireless connection with a wireless client through a wireless access point, and establishing a direct link setup (DLS) mode wireless connection with the wireless client; and selecting either infrastructure mode or DLS mode for communication with the wireless client based at least one characteristic of the infrastructure mode and DLS mode wireless connections; and then exchanging frames of data with the wireless client using the selected mode.

In some embodiments, the at least one characteristic of the wireless connections comprises at least one of the group consisting of: a quality of service of the wireless connections; a power consumption of the wireless connections; a received signal strength of the wireless connections; a time required to send a frame over the wireless connections; a maximum data rate of the wireless connections; and a packet loss rate of the wireless connections. Some embodiments comprise identifying the wireless client by receiving a message from the wireless access point that identifies the MAC address of the wireless client. In some embodiments, the message indicates whether the wireless client is capable of establishing a DLS connection. Some embodiments comprise before receiving the message from the wireless access point, transmitting a further message to the wireless access point that identifies one or more data stream types; wherein the message received from the wireless access point identifies the wireless client only when the wireless client supports the one or more data stream types. Some embodiments comprise identifying the wireless client by collecting destination MAC addresses in frames transmitted by the wireless access point. Some embodiments comprise after selecting DLS mode for the wireless client, selecting infrastructure mode for the wireless client in response to an event. In some embodiments, the event is selected from the group consisting of: a received signal strength of a DLS connection with the wireless client falls below a predetermined threshold; and no frames addressed to the wireless client are detected during a predetermined interval. Some embodiments comprise determining proximity information for the wireless client; and selecting the wireless client for DLS mode communications based on the proximity information. Some embodiments comprise establishing the infrastructure mode wireless connection on a first channel; establishing the DLS wireless connection on a second channel; and selecting the second channel when selecting DLS mode. Some embodiments comprise entering a power-save mode; receiving beacon signals from the wireless access point while in the power-save mode; and after every Nth beacon, wherein N>0, leaving the power-save mode, then communicating with the wireless client when DLS mode has been selected using DLS connections, and then entering the power-save mode again. In some embodiments, the wireless client, when DLS mode has been selected, receives the beacon signals, leaves the power-save mode when the method leaves the power-save mode, and enters power-save mode when the method enters the power-save mode. Some embodiments comprise receiving beacon signals from the wireless access point, wherein the wireless client, when DLS mode has been selected, receives the beacon signals from the wireless access point; establishing a communications schedule with the wireless client according to the beacon signals; and leaving a power-save mode, and establishing a DLS connection with the wireless client, according to the communications schedule; wherein the wireless client leaves the power-save mode, and establishes the DLS connection, according to the communications schedule.

In general, in one aspect, the invention features a computer program executable on a processor, comprising: instructions for establishing an infrastructure mode wireless connection with a wireless client through a wireless access point, and for establishing a direct link setup (DLS) mode wireless connection with the wireless client; and instructions for selecting either infrastructure mode or DLS mode for communication with the wireless client based at least one characteristic of the infrastructure mode and DLS mode wireless connections; and then instructions for exchanging frames of data with the wireless client using the selected mode.

In some embodiments, the at least one characteristic of the wireless connections comprises at least one of the group consisting of: a quality of service of the wireless connections; a power consumption of the wireless connections; a received signal strength of the wireless connections; a time required to send a frame over the wireless connections; a maximum data rate of the wireless connections; and a packet loss rate of the wireless connections. Some embodiments comprise instructions for identifying the wireless client according to a message received from the wireless access point that identifies the MAC address of the wireless client. In some embodiments, the message indicates whether the wireless client is capable of establishing a DLS connection. Some embodiments comprise instructions for transmitting a further message to the wireless access point that identifies one or more data stream types before receiving the message from the wireless access point; wherein the message received from the wireless access point identifies the wireless client only when the wireless client supports the one or more data stream types. Some embodiments comprise instructions for identifying the wireless client by collecting destination MAC addresses in frames transmitted by the wireless access point. Some embodiments comprise instructions for selecting infrastructure mode for the wireless client in response to an event after selecting DLS mode for the wireless client. In some embodiments, the event is selected from the group consisting of: a received signal strength of a DLS connection with the wireless client falls below a predetermined threshold; and no frames addressed to the wireless client are detected during a predetermined interval. Some embodiments comprise instructions for determining proximity information for the wireless client; and instructions for selecting the wireless client for DLS mode communications based on the proximity information. Some embodiments comprise instructions for establishing the infrastructure mode wireless connection on a first channel; instructions for establishing the DLS wireless connection on a second channel; and instructions for selecting the second channel when selecting DLS mode. Some embodiments comprise instructions for entering a power-save mode, wherein beacon signals are received from the wireless access point while in the power-save mode; and instructions for, after every Nth beacon, wherein N>0, leaving the power-save mode, then communicating with the wireless client when DLS mode has been selected using DLS connections, and then entering the power-save mode again. In some embodiments, the wireless client, when DLS mode has been selected, receives the beacon signals, leaves the power-save mode when the computer program leaves the power-save mode, and enters power-save mode when the computer program enters the power-save mode. Some embodiments comprise, wherein beacon signals are received from the wireless access point, and wherein the wireless client, when DLS mode has been selected, receives the beacon signals from the wireless access point; instructions for establishing a communications schedule with the wireless client according to the beacon signals; and instructions for leaving a power-save mode, and establishing a DLS connection with the wireless client, according to the communications schedule; wherein the wireless client leaves the power-save mode, and establishes the DLS connection, according to the communications schedule.

In general, in one aspect, the invention features a wireless access point comprising: a communications circuit to communicate with a plurality of wireless clients; and a memory to store addresses of the wireless clients; wherein the communications circuit comprises a transmitter to transmit a message to at least one of the wireless clients, wherein the message comprises the addresses of the wireless clients, and identifies the wireless clients that are capable of direct link setup (DLS) mode communications.

In some embodiments, the addresses of the wireless clients are media access control (MAC) addresses. In some embodiments, the communications circuit comprises a receiver to receive a further message from the at least one of the wireless clients, wherein the further message comprises a request for the addresses of the wireless clients; and wherein the transmitter transmits the message comprising the addresses of the wireless clients in response to the further message. In some embodiments, the communications circuit comprises a receiver to receive one or more further messages from one or more of the wireless clients, wherein each of the further messages indicates one or more data stream types supported by the respective one of the one or more wireless clients; and wherein the message comprising the addresses of the wireless clients includes only the addresses of wireless clients supporting the data stream types supported by the wireless client to which the message is transmitted.

In general, in one aspect, the invention features a wireless access point comprising: communications means for communicating with a plurality of wireless clients; and memory means for storing addresses of the wireless clients; wherein the communications means comprises transmitter means for transmitting a message to at least one of the wireless clients, wherein the message comprises the addresses of the wireless clients, and identifies the wireless clients that are capable of direct link setup (DLS) mode communications.

In some embodiments, the addresses of the wireless clients are media access control (MAC) addresses. In some embodiments, the communications means comprises receiver means for receiving a further message from the at least one of the wireless clients, wherein the further message comprises a request for the addresses of the wireless clients; and wherein the transmitter means transmits the message comprising the addresses of the wireless clients in response to the further message. In some embodiments, the communications means comprises receiver means for receiving one or more further messages from one or more of the wireless clients, wherein each of the further messages indicates one or more data stream types supported by the respective one of the one or more wireless clients; and wherein the message comprising the addresses of the wireless clients includes only the addresses of wireless clients supporting the data stream types supported by the wireless client to which the message is transmitted.

In general, in one aspect, the invention features a method for a wireless access point, the method comprising: communicating with a plurality of wireless clients; storing addresses of the wireless clients; and transmitting a message to at least one of the wireless clients, wherein the message comprises the addresses of the wireless clients, and identifies the wireless clients that are capable of direct link setup (DLS) mode communications. In some embodiments, the addresses of the wireless clients are media access control (MAC) addresses. Some embodiments comprise receiving a further message from the at least one of the wireless clients, wherein the further message comprises a request for the addresses of the wireless clients; and transmitting the message comprising the addresses of the wireless clients in response to the further message. Some embodiments comprise receiving one or more further messages from one or more of the wireless clients, wherein each of the further messages indicates one or more data stream types supported by the respective one of the one or more wireless clients; and wherein the message comprising the addresses of the wireless clients includes only the addresses of wireless clients supporting the data stream types supported by the wireless client to which the message is transmitted.

In general, in one aspect, the invention features a computer program executable on a processor for a wireless access point, the computer program comprising: instructions for communicating with a plurality of wireless clients; instructions for storing addresses of the wireless clients; and instructions for transmitting a message to at least one of the wireless clients, wherein the message comprises the addresses of the wireless clients, and identifies the wireless clients that are capable of direct link setup (DLS) mode communications.

In some embodiments, the addresses of the wireless clients are media access control (MAC) addresses. Some embodiments comprise wherein the wireless access point receives a further message from the at least one of the wireless clients, wherein the further message comprises a request for the addresses of the wireless clients; instructions for transmitting the message comprising the addresses of the wireless clients in response to the further message. In some embodiments, the wireless access point receives one or more further messages from one or more of the wireless clients, wherein each of the further messages indicates one or more data stream types supported by the respective one of the one or more wireless clients; and wherein the message comprising the addresses of the wireless clients includes only the addresses of wireless clients supporting the data stream types supported by the wireless client to which the message is transmitted.

The details of one or more implementations are set forth in the accompanying drawings and the description below. Other features will be apparent from the description and drawings, and from the claims.

Figure 1:
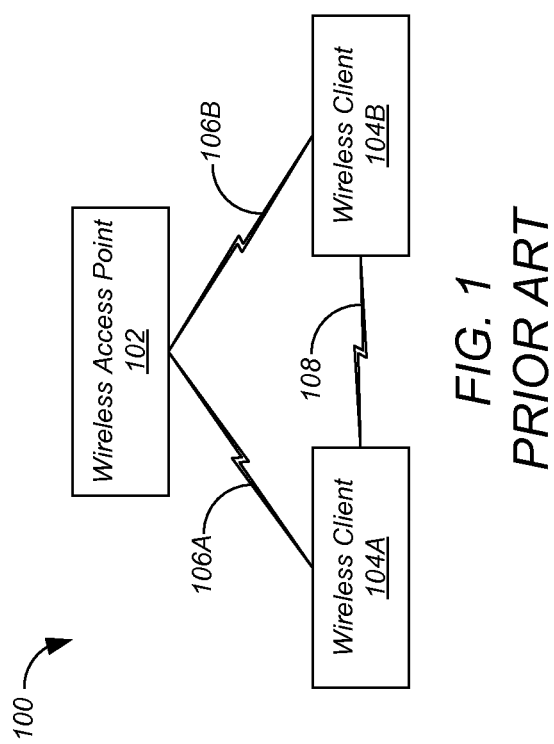
FIG. 1 shows a conventional IEEE 802.11 WLAN comprising a wireless access point passing traffic between two wireless clients in infrastructure mode.

The leading digit(s) of each reference numeral used in this specification indicates the number of the drawing in which the reference numeral first appears.

DETAILED DESCRIPTION

Embodiments of the present invention provide various DLS implementations. Some embodiments provide mechanisms for wireless clients to use DLS connections on channels other than the channel utilized by the BSS to which the wireless clients belong. Some embodiments provide power-save mechanisms for wireless clients employing DLS connections. Some embodiments provide mechanisms for automatic set up and tear down of DLS connections at the link layer (OSI layer 2). Some embodiments provide mechanisms for protecting DLS connections from interference generated by other traffic sources.

Figure 2:
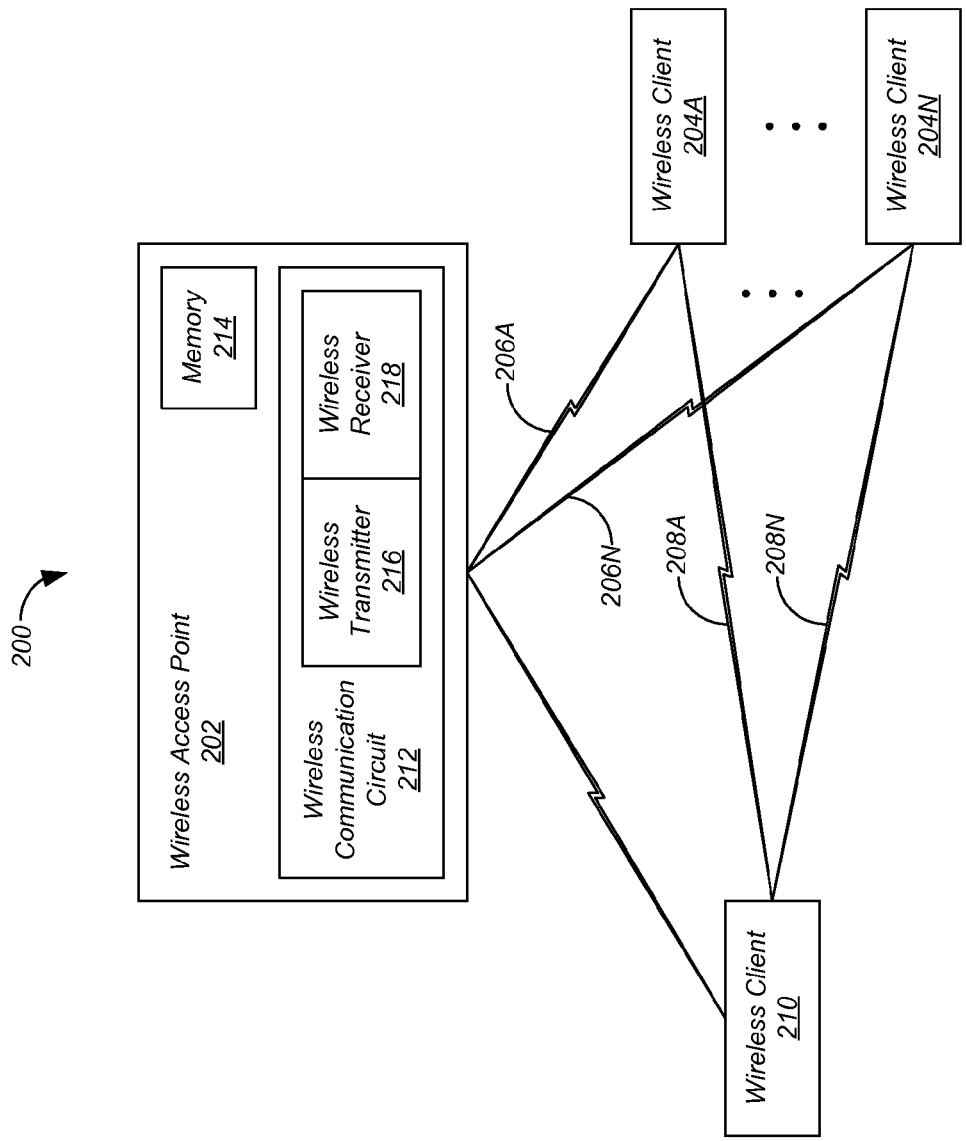
FIG. 2 shows a IEEE 802.11 WLAN according to a preferred embodiment of the present invention.

FIG. 2 shows an IEEE 802.11 WLAN 200 according to a preferred embodiment of the present invention. Although in the described embodiments, the elements of WLAN 200 are presented in one arrangement, other embodiments may feature other arrangements, as will be apparent to one skilled in the relevant arts based on the disclosure and teachings provided herein. WLAN 200 comprises a wireless access point 202, a plurality of wireless clients 204A-N, and a wireless client 210. Wireless client 210 can communicate with wireless clients 204 in infrastructure mode through wireless access point 202 over connections 206, or directly via DLS connections 208. Wireless client 210 is implemented according to one or more embodiments of the present invention, while wireless clients 204 can be implemented according to embodiments of the present invention, or as conventional wireless clients. Wireless access point 202 comprises a wireless communication circuit 212 and a memory 214. Wireless communication circuit 212 comprises a wireless transmitter 216 and a wireless receiver 218.

Figure 3:
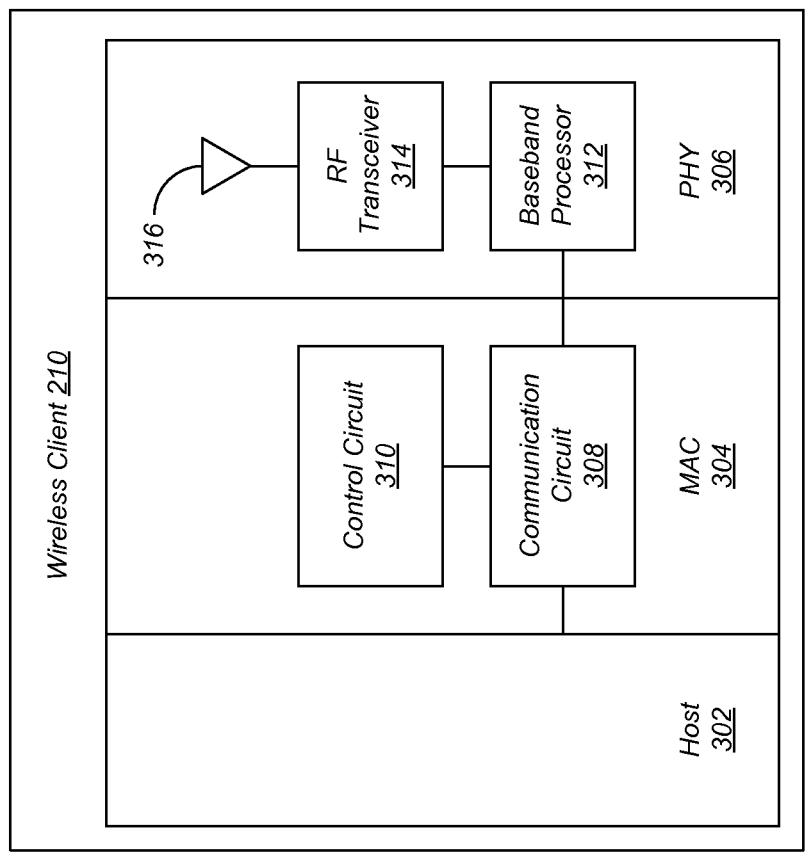
FIG. 3 shows detail of the wireless client of FIG. 2 according to a preferred embodiment of the present invention.

FIG. 3 shows detail of wireless client 210 of FIG. 2 according to a preferred embodiment of the present invention. Although in the described embodiments, the elements of wireless client 210 are presented in one arrangement, other embodiments may feature other arrangements, as will be apparent to one skilled in the relevant arts based on the disclosure and teachings provided herein. For example, the elements of wireless client 210 can be implemented in hardware, software, or combinations thereof. Wireless client 210 comprises a host 302, a media access controller (MAC) 304, and a physical-layer device (PHY) 306. MAC 304 comprises a communication circuit 308 and a control circuit 310. PHY 306 comprises a baseband processor 312, a radio-frequency (RF) transceiver 314, and an RF antenna 316. Wireless client 210 is preferably compliant with all or part of IEEE standard 802.11, including draft and approved amendments such as 802.11a, 802.11b, 802.11e, 802.11g, 802.11i, 802.11k, 802.11n, 802.11v, and 802.11w.

Figure 4:
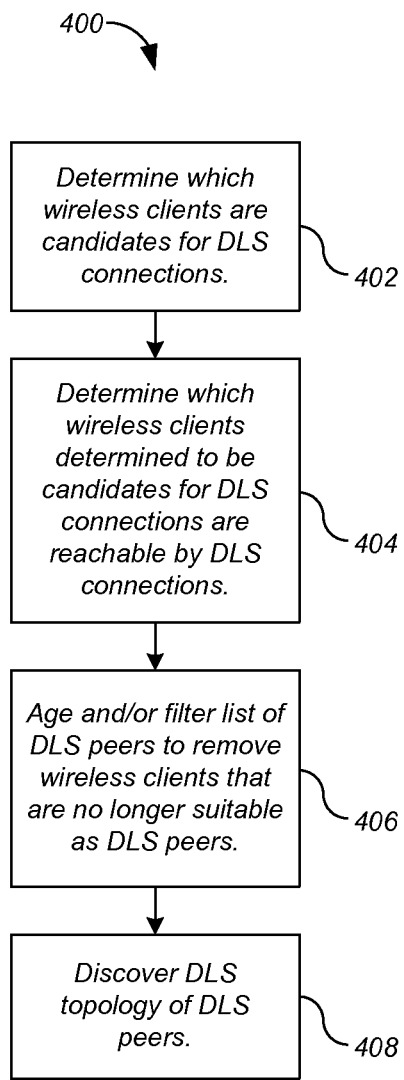
FIG. 4 shows a process for the wireless client of FIG. 2 according to a preferred embodiment of the present invention.

FIG. 4 shows a process 400 for wireless client 210 of FIG. 2 according to a preferred embodiment of the present invention. Although in the described embodiments, the elements of process 400 are presented in one arrangement, other embodiments may feature other arrangements, as will be apparent to one skilled in the relevant arts based on the disclosure and teachings provided herein. Wireless client 210 first determines which wireless clients 204 are candidates for DLS connections (step 402).

In some embodiments, wireless access point 202 creates a list of addresses, such as MAC or IP addresses, associated with the wireless clients 204, 210, stores the list in memory 214, and transmits a message to wireless client 210 that includes the list of addresses. In some embodiments, wireless client 210 sends a message to wireless access point 202 to request the list, and wireless access point 202 transmits a message comprising the list in response. IEEE 802.11 action management frames can be used for this purpose.

In some embodiments, the list also indicates which wireless clients 204, 210 are capable of DLS connections. Wireless access point 202 can assemble the list based on messages received from wireless clients 204, 210 that identify the DLS capabilities of wireless clients 204, 210.

In some embodiments, each wireless client 204, 210 can indicate the data stream types it will accept. For example, a wireless video playback device can indicate that it will accept only video data streams. In these embodiments, wireless access point 202 can tailor the messages so that each wireless client 204, 210 is included only in lists sent to wireless clients 204, 210 that support the data stream types specified by that wireless client 204, 210.

In some embodiments, wireless clients 204, 210 broadcast messages that indicate their DLS capabilities, for example at some random backoff interval following beacons transmitted by wireless access point 202. Preferably each message includes the BSSID so that it is only used by wireless clients in the same BSS.

In some embodiments, control circuit 310 of wireless client 210 creates the list of DLS candidates by collecting the addresses, such as MAC or IP addresses, in frames transmitted by wireless access point 202.

Referring again to process 400 of FIG. 4, wireless client 210 next discovers DLS peers among the DLS candidates. That is, wireless client 210 determines which of the wireless clients 204 determined to be candidates for DLS connections in step 402 are reachable by DLS connections (step 404). Preferably communication circuit 308 establishes a DLS mode wireless connection with each DLS candidate, and if the DLS connection is successful, adds the DLS candidate to a list of DLS peers. Preferably each of these "test" DLS connections is used to exchange quality of service (QoS) information between the DLS peers. In some embodiments, each test DLS connection has a DLS Timeout value on the order of one second. In other embodiments, each test DLS connection is torn down explicitly.

Referring again to process 400 of FIG. 4, wireless client 210 ages and/or filters the list of DLS peers to remove wireless clients 204 that are no longer suitable as DLS peers (step 406). In some embodiments, control circuit 310 of wireless client 210 removes a wireless client 204 from its DLS peer list when a received signal strength of a DLS connection with the wireless client 204 falls below a predetermined threshold. For example, the received signal strength can be determined based upon a received signal strength indication (RSSI). In some embodiments, control circuit 310 of wireless client 210 removes a wireless client 204 from the DLS peer list when control circuit 310 detects no frames addressed to that wireless client 204 during a predetermined interval.

Referring again to process 400 of FIG. 4, wireless client 210 discovers the DLS topology of its DLS peers (step 408). That is, control circuit 310 of wireless client 210 determines proximity information representing the proximity of each wireless client 204 in the DLS peer list. The proximities can be used, for example, to select among similar resources. For example, when a video stream is available from more than one peer, control circuit 310 can select the most proximate peer to obtain the best DLS connection for transfer of the video stream.

In some embodiments, the proximity for each peer is determined based upon the RSSI and supportable transmission rates for a DLS connection with that peer. During the DLS connection, wireless client 210 monitors the RSSI of the received frames as well as the data rates used for successful transmission. To minimize overhead, wireless client 210 transmits Data Null frames at various rates and notes the highest supportable transmit rate (MaxDLSrate) to each DLS peer. As part of the DLS Request/Response handshake, wireless client 210 also obtains the QoS capabilities of each DLS peer, which are used in establishing MaxDLSrate. The MaxDLSRate, along with the received RSSI, provides an estimate of the proximity of the DLS peer.

Preferably process 400 repeats occasionally (for example by returning to step 402) to determine whether new DLS candidates have entered the BSS of wireless access point 202.

In some cases, even though DLS mode communications are possible with a DLS peer, it is preferable to communicate with the peer using infrastructure mode communications, for example because an infrastructure mode connection provides higher data rates than a DLS mode connection. In some embodiments, MAC 304 of wireless client 210 automatically selects either infrastructure mode communications or DLS mode communications independently for each of its DLS peers.

Figure 5:
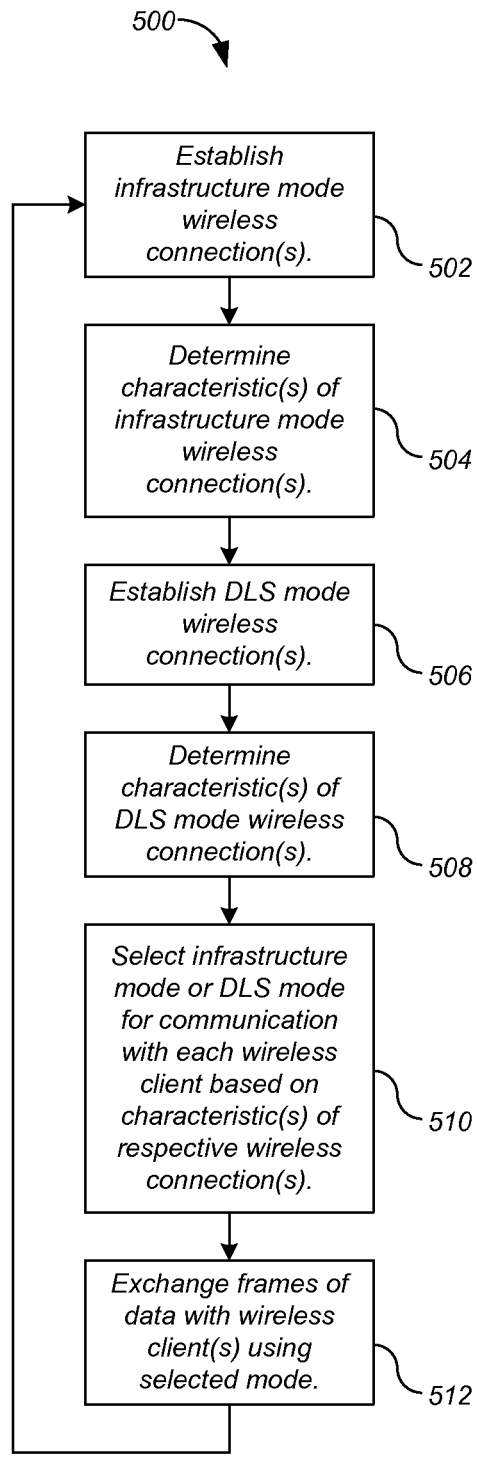
FIG. 5 shows a process for the MAC of the wireless client FIG. 2 according to a preferred embodiment of the present invention.

FIG. 5 shows a process 500 for MAC 304 of wireless client 210 of FIG. 2 according to a preferred embodiment of the present invention. Although in the described embodiments, the elements of process 500 are presented in one arrangement, other embodiments may feature other arrangements, as will be apparent to one skilled in the relevant arts based on the disclosure and teachings provided herein.

Communication circuit 308 of MAC 304 establishes at least one infrastructure mode wireless connection with each of the wireless clients 204 through wireless access point 202 (step 502). Preferably the wireless clients 204 are selected from the peer list created by process 400 of FIG. 4.

Control circuit 310 determines at least one characteristic of each of the infrastructure mode wireless connections (step 504). For example, the characteristics can include one or more of: a quality of service of the wireless connection, a power consumption of the wireless connection, a received signal strength of the wireless connection, a time required to send a frame over the wireless connection, a maximum data rate of the wireless connection, and a packet loss rate of the wireless connection.

Communication circuit 308 of MAC 304 establishes at least one DLS mode wireless connection with each of the wireless clients 204 (step 506). Control circuit 310 determines at least one characteristic, such as those described above, of each of the DLS mode wireless connections (step 508). In some embodiments, communication circuit 308 establishes the DLS connections for each wireless client 204 in multiple channels, and selects the best channel as the preferred DLS channel for that wireless client 204. This information can be maintained in the DLS peer list.

Control circuit 310 of MAC 304 selects either infrastructure mode or DLS mode for communication with each of the wireless clients 204 based on at least one of the characteristics of the respective infrastructure mode and DLS mode wireless connections (step 510). In some embodiments, wireless client 210 determines the maximum data rate at which packet loss is minimized, for both DLS mode and infrastructure mode, for a wireless client 204, and then selects the mode with the lower packet loss rate for that wireless client 204. In the event both modes have similar packet loss rates, wireless client 210 selects the mode with the lower power consumption. Power consumption can be determined in many well-known ways. One way is to determine the average time spent staying awake, time spent in transmit mode and time spent in receive mode.

In some embodiments, wireless client 210 determines the amount of time it takes to unicast a block of data at the maximum data rate, for both DLS mode and infrastructure mode, for a wireless client 204, and then selects the mode with the lower transit time for that wireless client 204. Packet loss and/or power consumption can be used as additional metrics in this example.

Communication circuit 308 of MAC 304 then exchanges frames of data with each wireless client 204 using the mode selected for that wireless client 204 (step 512). Preferably all or part of process 500 repeats occasionally (for example by returning to step 502), for example to accommodate changes to the list of DLS peers, or to accommodate changes in topology that could affect selection of communication mode.

In some embodiments, wireless clients 204, 210 employ a power-save mechanism featuring a common DLS communication window established according to the beacon signal transmitted by wireless access point 202. According to these embodiments, after every beacon, (or every N beacons, where N can be negotiated between DLS peers), a DLS communication window is defined. All DLS peers must stay awake during this predetermined window. A DLS peer can announce its intent to communicate with another DLS peer during the window. The DLS peers which agree to communicate during the window stay awake to complete that communication. At the end of the communication (which can be indicated by explicit signaling), the DLS peers can go to sleep immediately. The end of communication indication can be sent as a separate message or can be piggybacked (by setting a reserved bit in the MAC header) on the last message sent by a peer.

Figure 6:
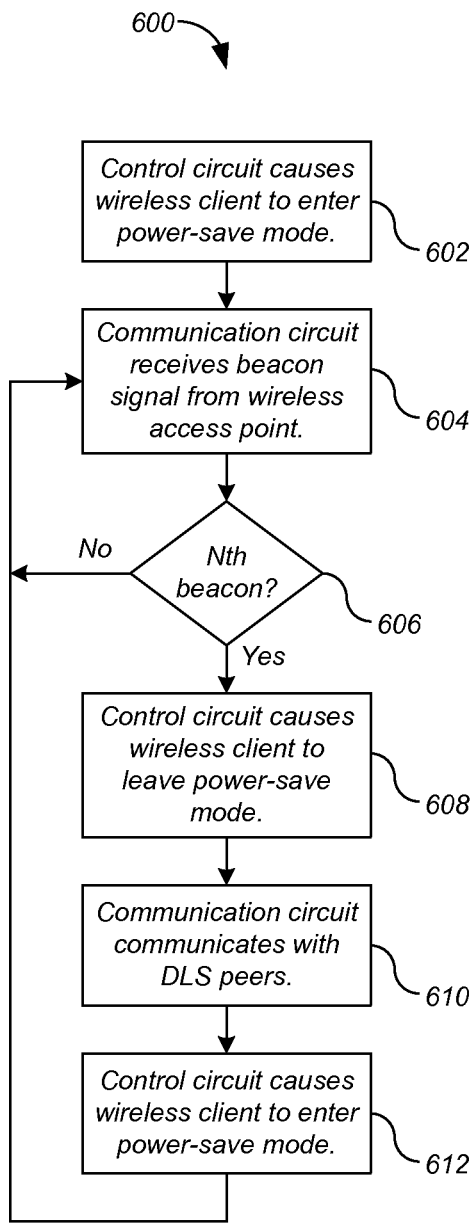
FIG. 6 shows a process for the MAC of the wireless client of FIG. 2 to employ a power-save mechanism featuring a common DLS communication window according to a preferred embodiment of the present invention.

FIG. 6 shows a process 600 for MAC 304 of wireless client 210 of FIG. 2 that employs a power-save mechanism featuring a common DLS communication window according to a preferred embodiment of the present invention. Although in the described embodiments, the elements of process 600 are presented in one arrangement, other embodiments may feature other arrangements, as will be apparent to one skilled in the relevant arts based on the disclosure and teachings provided herein.

Control circuit 310 causes wireless client 210 to enter a power-save mode (step 602). Communication circuit 308 remains awake to receive beacon signals from wireless access point 202 while wireless client 210 is in the power-save mode (step 604).

After every Nth beacon (step 606), where N>0, control circuit 310 causes wireless client 210 to leave the power-save mode (step 608). Communication circuit 308 then communicates with the wireless clients 204 for which DLS mode has been selected using DLS connections (step 610). Then control circuit 310 causes wireless client 210 to enter the power-save mode again (step 612). Preferably process 600 repeats (for example, by returning to step 604).

In some embodiments, wireless clients 204, 210 employ a power-save mechanism featuring DLS communication schedules established by DLS peers according to the beacon signal transmitted by wireless access point 202. According to these embodiments, DLS peers negotiate communication schedules based on a common timer synchronization function (TSF), which they receive from the beacon signal transmitted by wireless access point 202. The schedule can specify a start time and a communication interval, thus defining a series of communication windows separated by fixed intervals. Both DLS peers leave power-save mode at each scheduled start time, communicate during the communication window, and then resume power-save mode.

Figure 7:
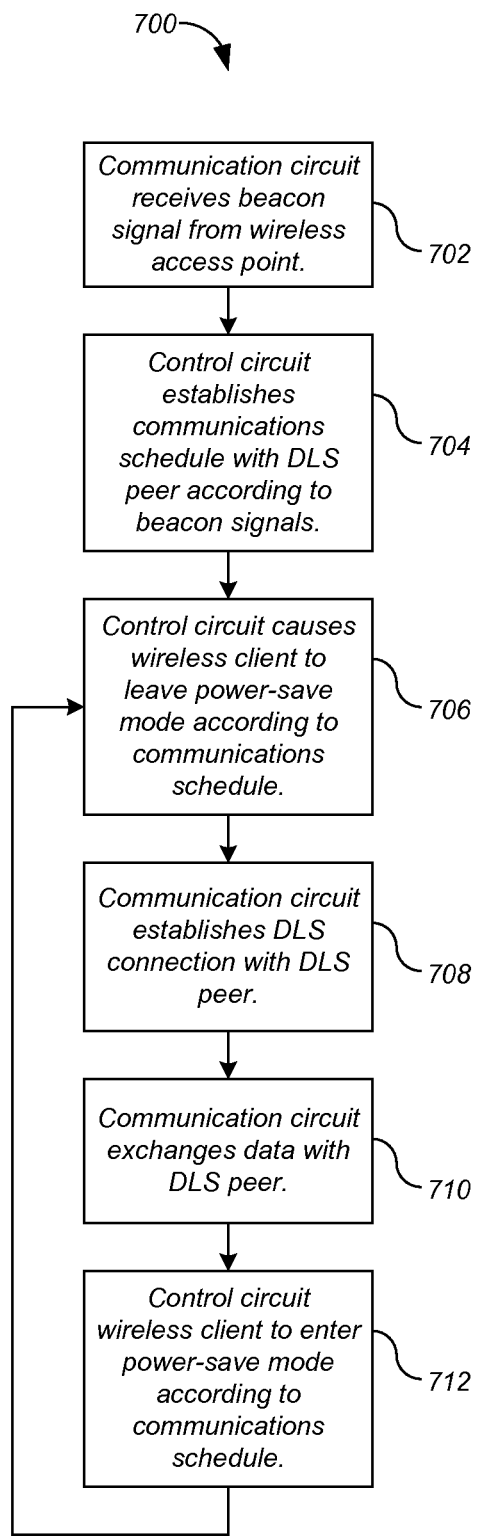
FIG. 7 shows a process for the MAC of the wireless client of FIG. 2 to employ a power-save mechanism featuring DLS communication schedules established by DLS peers according to a preferred embodiment of the present invention.

FIG. 7 shows a process 700 for MAC 304 of wireless client 210 of FIG. 2 that employs a power-save mechanism featuring DLS communication schedules established by DLS peers according to a preferred embodiment of the present invention. Although in the described embodiments, the elements of process 700 are presented in one arrangement, other embodiments may feature other arrangements, as will be apparent to one skilled in the relevant arts based on the disclosure and teachings provided herein.

Communication circuit 308 receives beacon signals from wireless access point 202 (step 702). Control circuit 310 establishes a communications schedule with one of wireless clients 204 according to the beacon signals transmitted by wireless access point 202 (step 704). Control circuit 310 causes wireless client 210 to leave power-save mode according to the communications schedule (step 706). Communication circuit 308 then establishes a DLS connection with the wireless client 204 (step 708) and exchanges data with the wireless client 204 (step 710). Control circuit 310 then causes wireless client 210 to enter power-save mode according to the communications schedule (step 712). Preferably process 700 repeats (for example, by returning to step 706).

In some embodiments, while remaining a member of the BSS it is associated with (the main BSS), wireless client 210 can operate a sub-BSS or establish a DLS connection in a channel different from that of the main BSS, thus allowing reduction of interference and improved performance. To wireless access point 202, it appears that the wireless clients 210 in a sub-BSS are operating in a power-save mode. Therefore, wireless access point 202 does not forward frames to the wireless clients 210 in a sub-BSS. All stations in the sub-BSSs remain synchronized to the main BSS by periodically listening for beacons from wireless access point 202 in the main BSS. Wireless client 210 can employ process 400 of FIG. 4 and/or process 500 of FIG. 5 in the sub-BSS to automatically establish DLS connections with other wireless clients 204 in the sub-BSS. Wireless clients 204, 210 in the sub-BSS can schedule test DLS connections according to the beacon transmitted by wireless access point 202. One advantage of using a DLS connection in a sub-BSS in a channel different than that of the main BSS is that the DLS connection is protected from interference from the main BSS.

In some embodiments, wireless client 210 informs wireless access point 202 when entering power-save mode. For example, communication circuit 212 transmits a message to wireless access point 202 informing wireless access point 202 that wireless client 210 is entering power-save mode. In some embodiments, a pair of wireless clients 210, before initiating a DLS connection, determine whether wireless access point 202 honors power-save mode for clients in DLS mode. For example, after informing wireless access point 202 that wireless clients are entering power-save mode, wireless clients 210 can exchange traffic through wireless access point 202. If wireless access point 202 buffers the traffic, and sets the appropriate Traffic Indication Map (TIM) bits in the beacon, then wireless access point honors power-save mode for clients in DLS mode.

Figure 8:
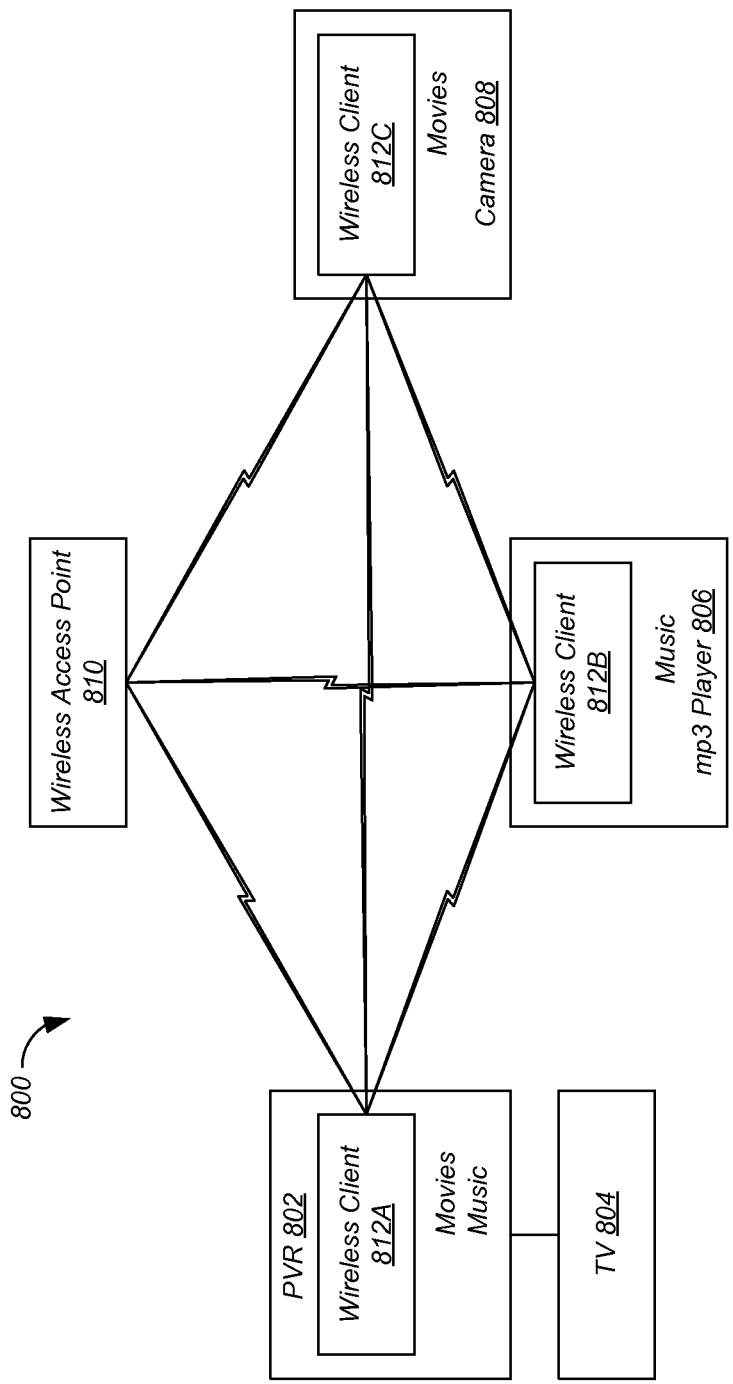
FIG. 8 shows an example home entertainment system featuring wireless clients capable of DLS communications according to a preferred embodiment of the present invention.

FIG. 8 shows an example home entertainment system 800 featuring wireless clients capable of DLS communications according to a preferred embodiment of the present invention. Home entertainment system 800 includes a personal video recorder (PVR) 802 connected to a television set (TV) 804, an mp3 player 806, a movie camera 808, and a wireless access point 810. Each of PVR 802, mp3 player 806, and camera 808 are implemented as wireless devices according to preferred embodiments of the present invention, and are associated with wireless access point 810. For example, each of PVR 802, mp3 player 806, and camera 808 include a wireless client 812A,B,C such as wireless client 210 of FIG. 2.

Each of the wireless devices (PVR 802, mp3 player 806, and camera 808) can cache media content that may not be available on others of the devices. For example, PVR 802 can store movies, such as recordings of television programs, and music, such as mp3 files. The mp3 player 806 can store music files. Camera 808 can store movies. These wireless devices can discover each other, identify content desired by users, and determine the most suitable peer device for obtaining the content. Home entertainment system 800 allows the content to be transferred among the wireless devices using DLS connections, without going through wireless access point 810, according to the techniques described above, thereby providing more efficient utilization of channel resources and better performance than a purely infrastructure wireless WLAN.

Figure 9B:
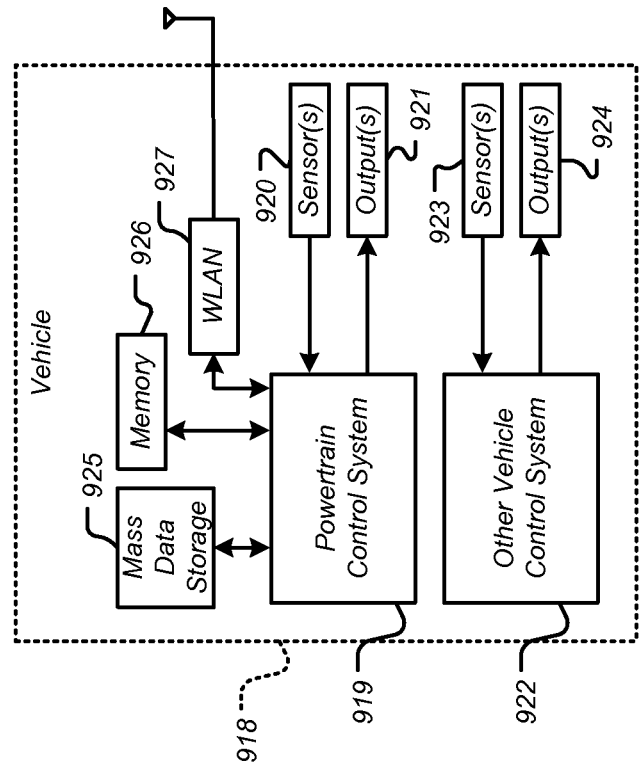
FIGS. 9A-9E show various exemplary implementations of the present invention.
Figure 9A:
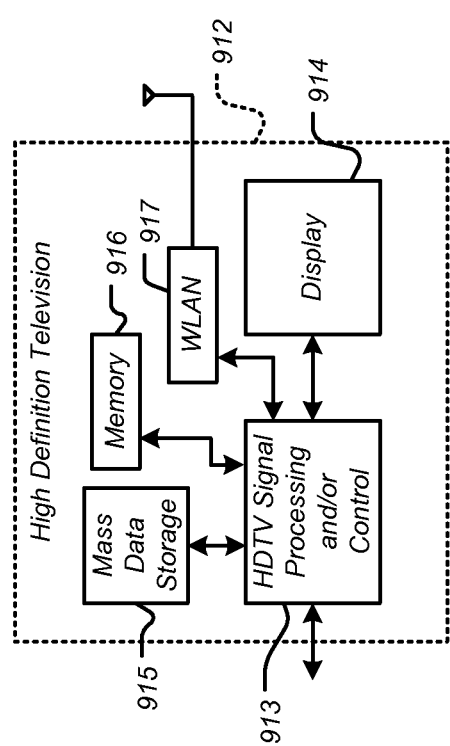

FIGS. 9A-9E show various exemplary implementations of the present invention. Referring now to FIG. 9A, the present invention can be implemented in a high definition television (HDTV) 912. The present invention may implement either or both signal processing and/or control circuits, which are generally identified in FIG. 9A at 913, a WLAN interface and/or mass data storage of the HDTV 912. The HDTV 912 receives HDTV input signals in either a wired or wireless format and generates HDTV output signals for a display 914. In some implementations, signal processing circuit and/or control circuit 913 and/or other circuits (not shown) of the HDTV 912 may process data, perform coding and/or encryption, perform calculations, format data and/or perform any other type of HDTV processing that may be required.

The HDTV 912 may communicate with mass data storage 915 that stores data in a nonvolatile manner such as optical and/or magnetic storage devices. The HDD may be a mini HDD that includes one or more platters having a diameter that is smaller than approximately 1.8". The HDTV 912 may be connected to memory 916 such as RAM, ROM, low latency nonvolatile memory such as flash memory and/or other suitable electronic data storage. The HDTV 912 also may support connections with a WLAN via a WLAN network interface 917.

Referring now to FIG. 9B, the present invention implements a control system of a vehicle 918, a WLAN interface and/or mass data storage of the vehicle control system. In some implementations, the present invention implements a powertrain control system 919 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 922 of the vehicle 918. The control system 922 may likewise receive signals from input sensors 923 and/or output control signals to one or more output devices 924. In some implementations, the control system 922 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 919 may communicate with mass data storage 925 that stores data in a nonvolatile manner. The mass data storage 925 may include optical and/or magnetic storage devices for example hard disk drives HDD and/or DVDs. The HDD may be a mini HDD that includes one or more platters having a diameter that is smaller than approximately 1.8". The powertrain control system 919 may be connected to memory 926 such as RAM, ROM, low latency nonvolatile memory such as flash memory and/or other suitable electronic data storage. The powertrain control system 919 also may support connections with a WLAN via a WLAN network interface 927. The control system 922 may also include mass data storage, memory and/or a WLAN interface (all not shown).

Figure 9C:
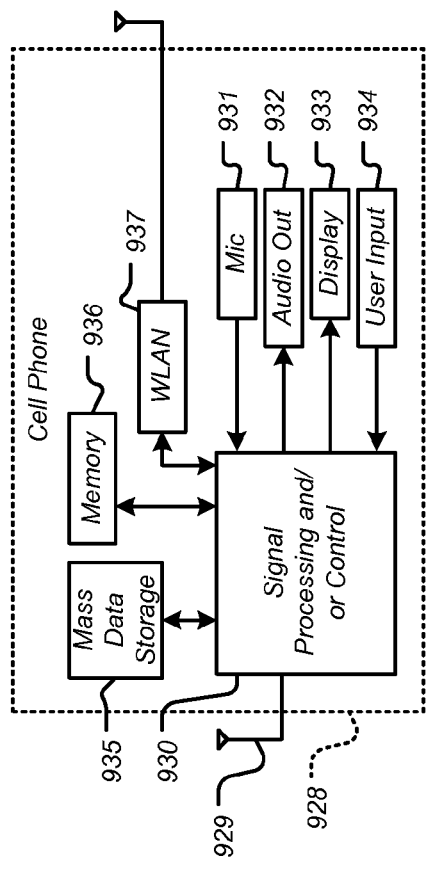

Referring now to FIG. 9C, the present invention can be implemented in a cellular phone 928 that may include a cellular antenna 929. The present invention may implement either or both signal processing and/or control circuits, which are generally identified in FIG. 9C at 930, a WLAN interface and/or mass data storage of the cellular phone 928. In some implementations, the cellular phone 928 includes a microphone 931, an audio output 932 such as a speaker and/or audio output jack, a display 933 and/or an input device 934 such as a keypad, pointing device, voice actuation and/or other input device. The signal processing and/or control circuits 930 and/or other circuits (not shown) in the cellular phone 928 may process data, perform coding and/or encryption, perform calculations, format data and/or perform other cellular phone functions.

The cellular phone 928 may communicate with mass data storage 935 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 928 may be connected to memory 936 such as RAM, ROM, low latency nonvolatile memory such as flash memory and/or other suitable electronic data storage. The cellular phone 928 also may support connections with a WLAN via a WLAN network interface 937.

Figure 9D:
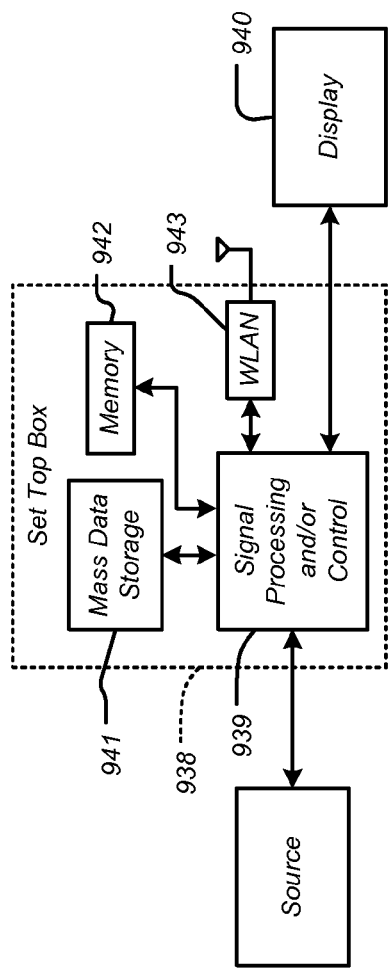

Referring now to FIG. 9D, the present invention can be implemented in a set top box 938. The present invention may implement either or both signal processing and/or control circuits, which are generally identified in FIG. 9D at 939, a WLAN interface and/or mass data storage of the set top box 938. The set top box 938 receives signals from a source such as a broadband source and outputs standard and/or high definition audio/video signals suitable for a display 940 such as a television and/or monitor and/or other video and/or audio output devices. The signal processing and/or control circuits 939 and/or other circuits (not shown) of the set top box 938 may process data, perform coding and/or encryption, perform calculations, format data and/or perform any other set top box function.

The set top box 938 may communicate with mass data storage 943 that stores data in a nonvolatile manner. The mass data storage 943 may include optical and/or magnetic storage devices for example hard disk drives HDD and/or DVDs. The HDD may be a mini HDD that includes one or more platters having a diameter that is smaller than approximately 1.8". The set top box 938 may be connected to memory 942 such as RAM, ROM, low latency nonvolatile memory such as flash memory and/or other suitable electronic data storage. The set top box 938 also may support connections with a WLAN via a WLAN network interface 943.

Figure 9E:
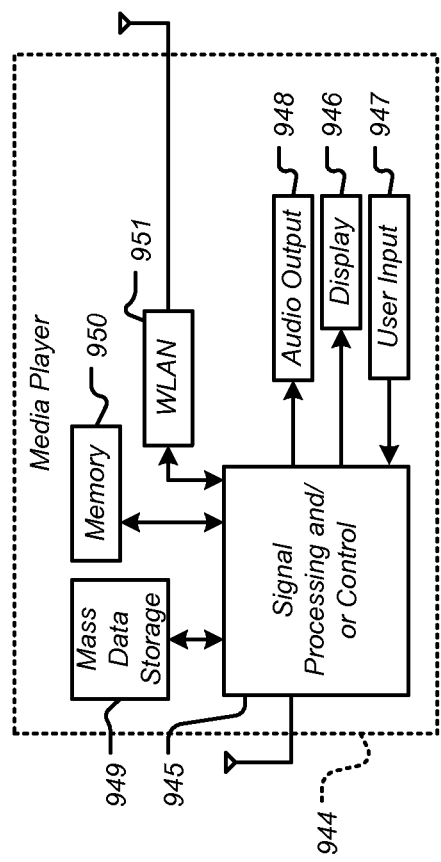

Referring now to FIG. 9E, the present invention can be implemented in a media player 944. The present invention may implement either or both signal processing and/or control circuits, which are generally identified in FIG. 9E at 945, a WLAN interface and/or mass data storage of the media player 944. In some implementations, the media player 944 includes a display 946 and/or a user input 947 such as a keypad, touchpad and the like. In some implementations, the media player 944 may employ a graphical user interface (GUI) that typically employs menus, drop down menus, icons and/or a point-and-click interface via the display 946 and/or user input 947. The media player 944 further includes an audio output 948 such as a speaker and/or audio output jack. The signal processing and/or control circuits 945 and/or other circuits (not shown) of the media player 944 may process data, perform coding and/or encryption, perform calculations, format data and/or perform any other media player function.

The media player 944 may communicate with mass data storage 949 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 944 may be connected to memory 950 such as RAM, ROM, low latency nonvolatile memory such as flash memory and/or other suitable electronic data storage. The media player 944 also may support connections with a WLAN via a WLAN network interface 951. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:
1. A client station comprising:
a communication circuit configured to
communicate, via an infrastructure mode, with an access point in a basic service set,
identify, based on signals transmitted by the access point, a plurality of client stations in the basic service set capable of communicating via a direct link setup mode, and
communicate, via the direct link setup mode, with the plurality of client stations; and
a control circuit configured to
determine strength of signals received from the plurality of client stations via the direct link setup mode;
determine highest supportable data rates for communicating with the plurality of client stations via the direct link setup mode;
select, based on (i) the strength of the signals received from the plurality of client stations via the direct link setup mode and (ii) the highest supportable data rates, one or more of the plurality of client stations for communicating via the direct link setup mode; and
negotiate a communication schedule with the one or more of the plurality of client stations based on a common timer synchronization function received by the one or more of the plurality of client stations from beacons transmitted by the access point,
wherein the communication schedule (i) specifies a start time and a communication interval to communicate with the one or more of the plurality of client stations via the direct link setup mode, and (ii) includes a series of communication windows separated by fixed intervals.

2. The client station of claim 1, wherein the control circuit is configured to select (i) a first channel to communicate with the access point via the infrastructure mode and (ii) a second channel to communicate with the one or more of the plurality of client stations via the direct link setup mode, wherein the second channel is different than the first channel.

3. The client station of claim 1, wherein:
the communication circuit is configured to communicate with a first client station of the one or more of the plurality of client stations at a data rate via (i) the infrastructure mode and (ii) the direct link setup mode; and
the control circuit is configured to
determine packet loss rates while the communication circuit is communicating with the first client station via (i) the infrastructure mode and (ii) the direct link setup mode, and
select (i) the infrastructure mode or (ii) the direct link setup mode having a lower packet loss rate to communicate with the first client station.

4. The client station of claim 1, wherein:
the communication circuit is configured to communicate with a first client station of the one or more of the plurality of client stations at a data rate via (i) the infrastructure mode and (ii) the direct link setup mode; and
the control circuit is configured to
determine packet loss rates while the communication circuit is communicating with the first client station via (i) the infrastructure mode and (ii) the direct link setup mode, and
select, based on the packet loss rates of (i) the infrastructure mode and (ii) the direct link setup mode, (i) the infrastructure mode or (ii) the direct link setup mode having a lower power consumption to communicate with the first client station.

5. The client station of claim 1, wherein:
the communication circuit is configured to unicast a block of data at a data rate to a first client station of the one or more of the plurality of client stations via (i) the infrastructure mode and (ii) the direct link setup mode; and
the control circuit is configured to select, to communicate with the first client station, (i) the infrastructure mode or (ii) the direct link setup mode having a lower transit time while unicasting the block of data at the data rate to the first client station.

6. The client station of claim 1, wherein the control circuit is configured to cause the client station to:
enter a power save mode in response to selecting the direct link setup mode to communicate with a first client station from the one or more of the plurality of client stations,
leave the power save mode at the start time of one of the communication windows,
communicate with the first client station via the direct link setup mode during the one of the communication windows, and
resume the power save mode at an end of the communication interval of the one of the communication windows.

7. A method comprising:
Communicating, via an infrastructure mode, with an access point in a basic service set;
identifying, at a client station, based on signals transmitted by the access point, a plurality of client stations in the basic service set capable of communicating via a direct link setup mode;
communicating, via the direct link setup mode, with the plurality of client stations;
determining strength of signals received at the client station from the plurality of client stations via the direct link setup mode;
determining highest supportable data rates for communicating with the plurality of client stations via the direct link setup mode;
selecting, based on (i) the strength of the signals received from the plurality of client stations via the direct link setup mode and (ii) the highest supportable data rates, one or more of the plurality of client stations for communicating via the direct link setup mode; and
negotiating a communication schedule with the one or more of the plurality of client stations based on a common timer synchronization function received by the one or more of the plurality of client stations from beacons transmitted by the access point,
wherein the communication schedule (i) specifies a start time and a communication interval to communicate with the one or more of the plurality of client stations via the direct link setup mode, and (ii) includes a series of communication windows separated by fixed intervals.

8. The method or claim 7, further comprising selecting (i) a first channel to communicate with the access point via the infrastructure mode and (ii) a second channel to communicate with the one or more of the plurality of client stations via the direct link setup mode, wherein the second channel is different than the first channel.

9. The method of claim 7, further comprising:
communicating with a first client station of the one or more of the plurality of client stations at a data rate via (i) the infrastructure mode and (ii) the direct link setup mode;
determining packet loss rates while communicating with the first client station via (i) the infrastructure mode and (ii) the direct link setup mode; and
selecting (i) the infrastructure mode or (ii) the direct link setup mode having a lower packet loss rate to communicate with the first client station.

10. The method of claim 7, further comprising:
communicating with a first client station of the one or more of the plurality of client stations at a data rate via (i) the infrastructure mode and (ii) the direct link setup mode;
determining packet loss rates while communicating with the first client station via (i) the infrastructure mode and (ii) the direct link setup mode; and
selecting, based on the packet loss rates of (i) the infrastructure mode and (ii) the direct link setup mode, (i) the infrastructure mode or (ii) the direct link setup mode having a lower power consumption to communicate with the first client station.

11. The method of claim 7, further comprising:
unicasting a block of data at a data rate to a first client station from the one or more of the plurality of client stations via (i) the infrastructure mode and (ii) the direct link setup mode; and
selecting, to communicate with the first client station, (i) the infrastructure mode or (ii) the direct link setup mode having a lower transit time while unicasting the block of data at the data rate to the first client station.

12. The method of claim 7, further comprising causing the client station to:
enter a power save mode in response to selecting the direct link setup mode to communicate with a first client station of the one or more of the plurality of client stations,
leave the power save mode at the start time of one of the communication windows, communicate with the first client station via the direct link setup mode during the one of the communication windows, and resume the power save mode at an end of the communication interval of the one of the communication windows.

* * * * *